(12) United States Patent
Peña-Mora et al.

(10) Patent No.: US 7,162,699 B1
(45) Date of Patent: Jan. 9, 2007

(54) MECHANISMS AND ARTIFACTS TO MANAGE HETEROGENEOUS PLATFORM INTERFACES IN A COLLABORATION SYSTEM

(75) Inventors: Feniosky Peña-Mora, Cambridge, MA (US); Chang Kuang, Foster City, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 657 days.

(21) Appl. No.: 10/125,761

(22) Filed: Apr. 18, 2002

Related U.S. Application Data (63) Continuation-in-part of application No. 09/540,947, filed on Mar. 31, 2000, now Pat. No. 7,007,235.

(60) Provisional application No. 60/285,885, filed on Apr. 23, 2001, provisional application No. 60/127,672, filed on Apr. 2, 1999.

(51) Int. Cl.
G06F 17/00 (2006.01)
G06F 15/16 (2006.01)

(52) U.S. Cl. ............ 715/751; 715/754; 715/753; 715/759; 709/204; 709/205; 709/227

(58) Field of Classification Search ........ 715/748–759; 709/204–205, 213, 216, 227
See application file for complete search history.

(56) References Cited

U.S. PATENT DOCUMENTS

| | | | |
|---|---|---|---|
| 4,788,538 A | 11/1988 | Klein et al. | |
| 4,974,173 A | 11/1990 | Stefik et al. | |
| 5,068,853 A | 11/1991 | Soma et al. | |
| 5,353,398 A * | 10/1994 | Kitahara et al. | 715/759 |
| 5,363,507 A * | 11/1994 | Nakayama et al. | 715/743 |
| 5,475,836 A | 12/1995 | Harris et al. | |
| 5,557,725 A | 9/1996 | Ansberry et al. | |
| 5,583,993 A * | 12/1996 | Foster et al. | 709/205 |
| 5,689,641 A * | 11/1997 | Ludwig et al. | 709/241 |
| 5,717,879 A | 2/1998 | Moran et al. | |
| 5,719,942 A * | 2/1998 | Aldred et al. | 709/228 |
| 5,758,079 A * | 5/1998 | Ludwig et al. | 709/204 |
| 5,796,396 A * | 8/1998 | Rich | 715/741 |
| 5,821,925 A * | 10/1998 | Carey et al. | 715/757 |
| 5,841,977 A * | 11/1998 | Ishizaki et al. | 709/204 |
| 5,854,893 A | 12/1998 | Ludwig et al. | |
| 5,872,923 A | 2/1999 | Schwartz et al. | |
| 5,872,924 A * | 2/1999 | Nakayama et al. | 709/205 |
| 5,875,186 A | 2/1999 | Belanger et al. | |
| 5,889,945 A * | 3/1999 | Porter et al. | 709/204 |
| 5,940,082 A | 8/1999 | Brinegar et al. | |
| 5,949,414 A * | 9/1999 | Namikata et al. | 715/753 |
| 5,996,002 A | 11/1999 | Katsurabayashi et al. | |

(Continued)

OTHER PUBLICATIONS

Saul Greenberg, "A Fisheye Text Editor for Relaxed-WYSIWIS Groupware," ACM SIGCHI'96 Conference of Human Factors in Computing System, Comanion Proceedings, p. 212-213.*

(Continued)

*Primary Examiner*—Tadesse Hailu
(74) *Attorney, Agent, or Firm*—Daly, Crowley, Mofford & Durkee, LLP (57) ABSTRACT

A collaboration system including a coordinated distributed design process and which allows individuals to hold interactions over a network and work together in a coordinated fashion on shared problems, wherein a controlling participant in control of the floor of a collaboration interaction and in control of certain aspects of the user interfaces of one or more collaboration participants is described. Furthermore, a user interface is described that can minimize confusion that can otherwise result from collaboration participants having user interfaces with different sizes and resolutions.

49 Claims, 5 Drawing Sheets

U.S. PATENT DOCUMENTS

| | | | |
|---|---|---|---|
| 5,996,003 A * | 11/1999 | Namikata et al. | 709/205 |
| 6,047,288 A * | 4/2000 | Kurosawa et al. | 707/9 |
| 6,049,820 A | 4/2000 | Murphy, Jr. et al. | |
| 6,065,046 A | 5/2000 | Feinberg et al. | |
| 6,219,693 B1 | 4/2001 | Napolitano et al. | |
| 6,272,338 B1 | 8/2001 | Modzelesky et al. | |
| 6,272,341 B1 | 8/2001 | Threadgill et al. | |
| 6,295,551 B1 * | 9/2001 | Roberts et al. | 709/205 |
| 6,297,819 B1 * | 10/2001 | Furst | 715/733 |
| 6,298,370 B1 | 10/2001 | Tang et al. | |
| 6,314,491 B1 | 11/2001 | Freerksen et al. | |
| 6,343,313 B1 | 1/2002 | Salesky et al. | |
| 6,691,151 B1 | 2/2004 | Cheyer et al. | |
| 6,728,784 B1 * | 4/2004 | Mattaway | 709/245 |

OTHER PUBLICATIONS

Richard Bentley, et al., "An architecture for tailoring cooperative multi-user displays," CSCW Research Center 1992 ACM.*

Hussein, et al., "CAIRO: A System for Facilitating Communication in a Distributed Collaborative Engineering Environment," 1995 IEEE.*

Mark Roseman and Saul Greenberg, "Building Real-Time Groupware with GroupKit, A Groupware Toolkit", ACM Transactins on Computer-Human Interaction, vol. 3, No. 1, Mar. 1996, pp. 66-106.*

John A. Mariani, "SISCO: Providing a Cooperation Filter for a Shared Information Space," ACM 1997.*

James "Bo" Begole, et al., "Supporting Worker Independence in Collaboration Transparency", ACM 1998.*

Paul Dourish, "Open Implementation and Flexibility in CSCW Toolkits", chapter 4: Applying Reflection in a CSCW Toolkit, pp. 49-58, Xerox Ltd 1996.*

Vadhavkar, Sanjeev, "Team Interaction Space Effectiveness for Globally Dispersed Teams: Theory and Case Studies", Thesis written for Doctor of Science in Information Technology, Jun. 2001, pp. 1-275.

Kuang, Chang, "Multi-Server Collaboration System for Disaster Relief Mission Planning", Thesis written for Master of Science, Jun. 2001, pp. 1-125.

Wang, Wei, "Computer-Supported Virtual Collaborative Learning and Assesment Framework for Distributed Learning Environment", Thesis written for Master of Science, May 2002, pp. 1-171.

Dwivedi, Gyanesh, Hari, "Multiple Device Collaborative and Real Time Analysis System for Project Management in Engineering", Thesis written for Master of Science, May 2001, pp. 1-54.

Bentley et al.; "An Architecture for Tailoring Cooperating Multi-User Displays;" CSCW 92 Proceedings, Nov. 1992; pp. 187-194.

Bowden et al.; "C3I System Analysis Using the Distributed Interactive C3I Effectiveness (DICE) Simulation;" 0-7803-4053-1/97; 1997 IEEE.

Garcia et al.; "Extending a Collaborative Architecture to Support Emotional Awareness;" http://www.ai.mit.edu/people/jvelas/ebaa99/garcia-ebaa99.pdf; 1999.

Housein et al.; "CAIRO: A System for Falicitating Communication in a Distributed Collaborative Engineering Environment;" 1995; http://citeseer.nj.nec.com/context/1861435/9771.

Kelly et al.; "A Facilitator's General Model for Managing Scio-Emotional Issues in Group Support Systems Meeting Environments;" 1060-3425/91; 1997 IEEE; pp. 114-123.

Rich et al.; "Adding a Collaborative Agent to Graphical User Interface;" pp. 21-30; UIST '96, Seattle WA; 1996 ACM 0-89791-798-7/96/11.

* cited by examiner

MECHANISMS AND ARTIFACTS TO MANAGE HETEROGENEOUS PLATFORM INTERFACES IN A COLLABORATION SYSTEM

CROSS REFERENCE TO RELATED APPLICATIONS

This application claims the benefit of application No. 60/285,885 filed Apr. 23, 2001 under 35 U.S.C. §119(e), and is a continuation in part of, and claims the benefit of, co-pending U.S. patent application Ser. No. 09/540,947, entitled Collaborative Agent Interaction Control and Synchronization System, filed Mar. 31, 2000, now U.S. Pat. No. 7,007,235 which application claims the benefit of application No. 60/127,672 filed Apr. 2, 1999 under 35 U.S.C. § 119(e). Each of the aforementioned applications are incorporated herein by reference in their entirety.

STATEMENT REGARDING FEDERALLY SPONSORED RESEARCH

This invention was made with government support under Contract No. CMS-987557 awarded by the National Science Foundation. The government has certain rights in this invention.

FIELD OF THE INVENTION

This invention relates to systems for supporting a coordinated distributed interaction process and more particularly to systems which allow individuals to interact over a network and work together in a coordinated fashion.

BACKGROUND OF THE INVENTION

As is known in the art, collaborative systems refer to a class of systems in which multiple users participate in a particular activity (e.g. a business meeting, a meeting to solve an engineering problem, a lecture, etc.).

As is also known, the emergence of high speed communication networks and improved visualization techniques provide the foundation for making such computer based collaboration practical. Various collaboration tools and conferencing systems have been developed by academic institutions, office system manufacturers and communication companies.

Various research in the area of computer mediated communication includes multiple disciplines and three diverse focus areas have been identified as emerging in this research field: (1) Electronic Meeting Systems (EMS); (2) Video Conferencing; and (3) Shared social spaces. Each of these groups represents a different approach to computer mediated communication.

EMS research focuses on the interaction process and decision support tools for the interaction process. Video conferencing research is concerned with transmitting multimedia data between participants (especially audio and video data). The shared social spaces perspective is concerned with enabling interaction and experience across distance and providing awareness and persistence within a virtual world.

Electronic meeting systems encompass a large body of research dedicated to the support of participants in traditional interaction settings. The GroupSystems EMS and the Xerox Parc Collab project are among the first such systems developed. Both systems have tools that structure brainstorming and problem solving processes and enforce interaction controls on the participants within the shared media. However, the control of the floor in a discussion is governed by physical meeting cues since all participants are co-located.

Initial research on video conferencing focused on the technical aspects of transmitting video and audio data among individuals. Much of the initial work was constrained to two-person interactions and a large portion of the work utilized a telephony paradigm for the interaction. Further developments have occurred rapidly in this field and most modern systems such as Microsoft NetMeeting, Intel Proshare, PictureTel, and SGI Inperson provide multi-person interaction and have extended audio and video services to include shared whiteboards, editors and browsers. However, these conferencing systems lack any appropriate concurrency control mechanisms and are cumbersome to use for medium or large size work groups.

The final area of research of telepresence is devoted to the study of virtual communities and interaction in a virtual environment. Several tools have been developed to provide awareness, persistence, and interaction in cyberspace. The two leading research efforts in this field are TeamRooms and Worlds. The primary concern of these systems is in the representation of physical concepts of space and place in the virtual world. The environments developed provide richer interaction contexts, but are currently constrained by network bandwidth and display technology.

U.S. patent application Ser. No. 09/540,946, entitled Collaborative Agent Interaction Control and Synchronization System, filed Mar. 31, 2000, which application claims the benefit of application No. 60/127,672 filed Apr. 2, 1999 under 35 U.S.C. 119(e), both of which applications are assigned to the same assignee as this patent application and are incorporated herein by reference in their entirety, teaches a collaborative agent interaction control and synchronization system. The collaborative system interprets a physical interaction environment and represents the physical interaction environment as a virtual environment and also exploits the characteristics of the communication medium. This is accomplished through the deconstruction of group interaction into its core elements and the translation of these elements into computational representations. In addition, the system models facilitation processes in order to allow intelligent agent manipulation of the interaction process. With this particular arrangement, a system for allowing individuals to hold interactions over a network and work together in a coordinated fashion on shared design problems is provided.

It should be recognized that EMS systems can provide connectivity between interaction participants having a variety of processing devices with a variety of graphical displays or user interfaces. The processing devices include, but are not limited to, desktop computers, laptop computers, personal digital assistants (PDAs), wireless telephones, and pagers. Since each interaction participant can have a different field of view on their respective user interface, confusion can result as the interaction participants interact. The confusion can result in increased interaction time as participants attempt to understand what other participants are seeing or doing on their respective user interfaces.

It would, therefore, be desirable to provide a system that allows individuals to hold interactions over a network and work together in a coordinated fashion on shared problems. It would also be desirable to have a system that provides automated facilitation services, that supports a variety of interaction structures, and that provides floor control policies to dynamically control the transition of the speaking state (the floor) from one participant to another (floor control policies). It would also be desirable to provide a system that can provide optimal views for interaction participants having dissimilar fields of view on their respective user interface.

SUMMARY OF THE INVENTION

In accordance with the present invention, a computer system having a display includes an information view associated with a pointing icon, the information view disposed upon the display and moves with the pointing icon on the display.

In accordance with the mechanisms and artifacts to manage heterogeneous platform interfaces in a collaboration system, hereafter referred to as the system, includes an information view associated with an indicator icon, the information view disposed upon one or more collaboration participant processing devices, for example, computers and personal digital assistants (PDAs). The information view can display a variety of information.

In accordance with another aspect of the present invention, the system includes a display border portion disposed within the display field of a first one of a plurality of collaboration participant processing devices. The display border portion corresponds to another display field associated with another one of the plurality of collaboration participant processing devices.

In accordance with yet another aspect of the present invention, the system includes generating an information view associated with the indicator icon, identifying a controlling participant, and controlling the indicator icon with a collaboration participant processing device associated with the controlling participant.

In accordance with yet another aspect of the present invention, the system includes generating a display border portion disposed within the display field of a first one of a plurality of collaboration participant processing devices. The display border portion corresponds to another display field associated with another one of the plurality of collaboration participant processing devices.

In accordance with yet another aspect of the present invention, the system includes a computer medium having computer readable code with instructions for generating an information view associated with the indicator icon, identifying a controlling participant, and controlling the indicator icon with a collaboration participant processing device associated with the controlling participant.

In accordance with yet another aspect of the present invention, the system includes a computer medium having computer readable code with instructions for generating a display border portion disposed within the display field of a first one of a plurality of collaboration participant processing devices. The display border portion corresponds to another display field associated with another one of the plurality of collaboration participant processing devices.

With this particular arrangement, the system provides floor control policies to indicate the speaking state (the floor) from among the interaction participants. Also with this particular arrangement, the system provides a view on a user interface of a display border portion that corresponds to a view seen by another interaction participant having a different field of view on their respective user interface. It will also be understood that a plurality of such display border portions can be provided, each display border portion associated with an interaction participant.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Before describing the present invention, some introductory concepts and terminology are explained.

An "Agenda" is a set of guidelines for the topics of discussion in a particular interaction setting. "Asynchronous" interaction is communication that is stored in some form before transmission to the receiver of the information. The transmission to the receiver can be generated after a time delay.

"Collaboration," as used herein, refers to work performed jointly with others especially in an intellectual endeavor. "Conferencing" as used herein is the act of structured and formal group interaction and sometimes refers exclusively to distributed group interchange.

"Facilitation," as used herein, refers to the act of providing process interventions in group discussion to enhance the efficiency and effectiveness of the interaction.

A "participant," as used herein, refers to a user of the conferencing or collaboration system that registers with a Name Server. A participant may have a specific role in a collaboration instance. The simplest example is that of a "chairman." The chairman is in charge of an interaction and presides over the proceedings. On a deeper level, there may be participants that are in charge of certain functional units. He/she may have specific applications or databases that are dedicated towards his/her role and can bring any of these to a session.

A "session," as used herein, refers to a time and space in which interaction participants come together for a common purpose.

"Floor," as used herein, refers to the right of one member of a group to communicate to other members within a group discussion, session, or interaction. A participant that has the floor is herein referred to as a "controlling participant," or alternatively, as a participant having the floor.

"Interaction," as used herein, refers to communication that engenders reciprocal communication or action.

"Knowledge," as used herein, refers to the conceptual model of the environment and other information that a person is exposed to and assimilates.

"Learning," as used herein, refers to the process by which knowledge is built, transferred and shared.

"Meeting," as used herein, refers to individuals coming together for a common purpose.

"Negotiation," as used herein, refers to the process of resolving conflicts or disputes among individuals.

"Synchronous," as used herein, refers to events happening, existing, or arising at the same time while "synchronous interaction" refers to communications that are immediate and whose expected response is immediate. These include face to face interactions, telephone calls and video conference interactions.

"Telepresence," as used herein, is the ability to provide a semblance of co-location of distributed individuals through the use of computer and communication technologies.

An "interaction environment" as used herein includes a user interface presented to a participant in a collaboration session. The interaction environment can also include other elements such as a keyboard and a pointing device. The user interface can be, but is not limited to, a graphical display.

Figure 1:
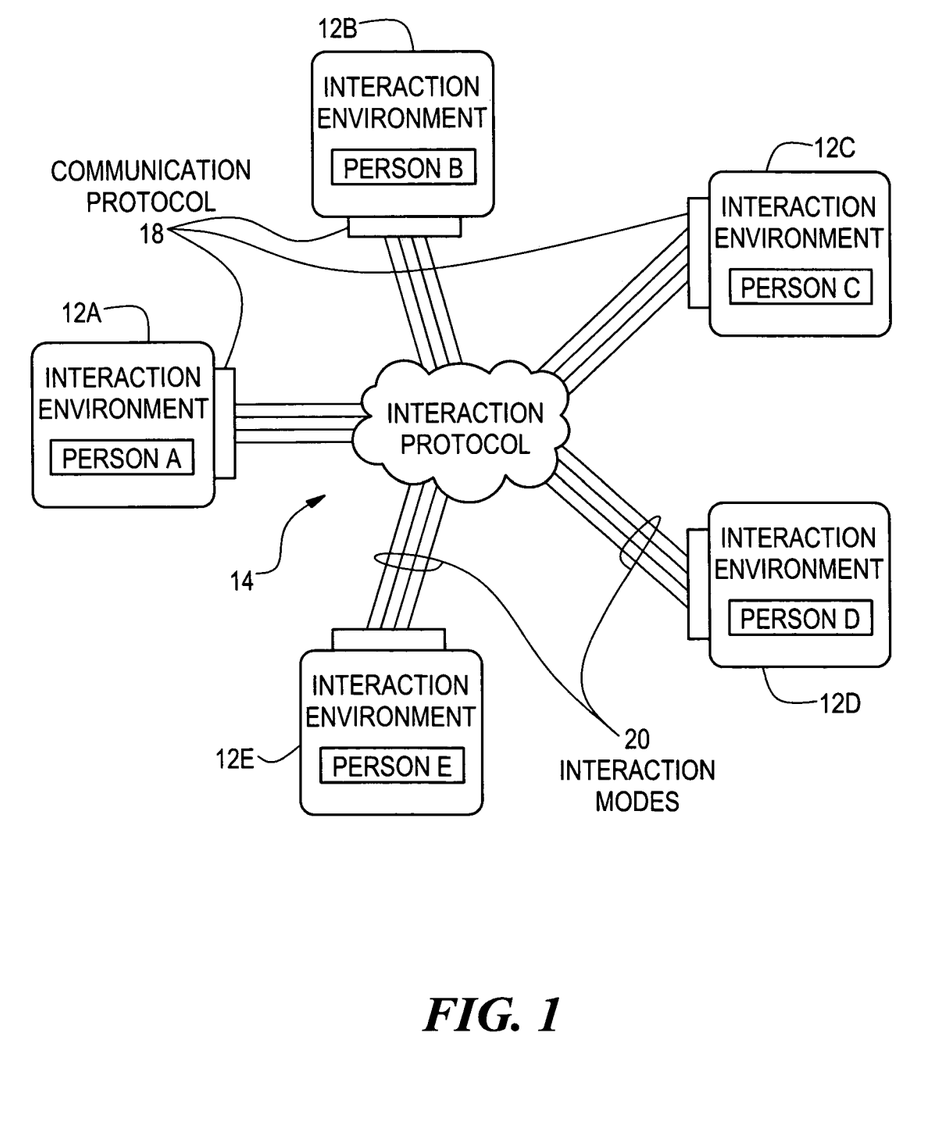
FIG. 1 is a block diagram of an interaction system.

Referring now to FIG. 1, an interaction system 10 includes a plurality of interaction environments 12A–12E, generally denoted 12. Each of the interaction environments include a processing device or machine coupled by a network 14 over which an interaction protocol 16, a communication protocol 18 and interaction modes 20 are implemented and enforced between the environments 12. The interaction environments 12 define an interface between human and machine models of the interaction. The interactions are typically exemplified by metaphors that represent protocol distinctions. For example a room metaphor is commonly used to denote presence of individuals working together on a task in digital proximity. The interaction environments 12 thus define a space for the individual's interface to the machine and other networked individuals.

The communication protocols 18 correspond to a set of rules for information transmission across a network and enable the transmission of information from one machine to another through the network 14.

Interaction protocols 16 enforce order on the communication over the network collaboration by controlling the ability to address particular individuals. An interaction protocol is a set of rules and algorithms that govern the communication and accessibility of participants in an interaction. These include definitions of proximity (proximity in a distributed sense has different implications than in the physical environment, i.e. proximity refers to participants connected to the same session), addressability (controls over the ability to interact with others in the interaction environment) availability (information about a participant in an interaction) and presence (definitions of visibility of individuals to others).

The interaction modes 20 define the input and output devices by which information is displayed within each individual's interaction environment. Interaction Modality defines the variety of information structures and media available to the interaction. These may include audio transmission, video transmission, image transmission, text transmission and structured data (in the form of databases, schedules, CAD drawings, formatted text, etc.)

The interaction environments 12A–12E can be provided over a network 14 having an interaction protocol 16, a communication protocol 18 and interaction modes 20 of a type described in U.S. patent application Ser. No. 09/540, 947 entitled Collaborative Agent Interaction Control and Synchronization System, filed Mar. 31, 2000, assigned to the assignee of the present invention, and incorporated herein by reference.

It should be recognized that the interaction environments 12A–12E correspond to processing devices having user interfaces, each of which can be of a different size, shape, and resolution. For example, one or more of the interaction environments 12A–12E can be a desktop computer, a laptop computer, a personal digital assistant (PDA), a wireless telephone, and a pager.

Figure 2A:
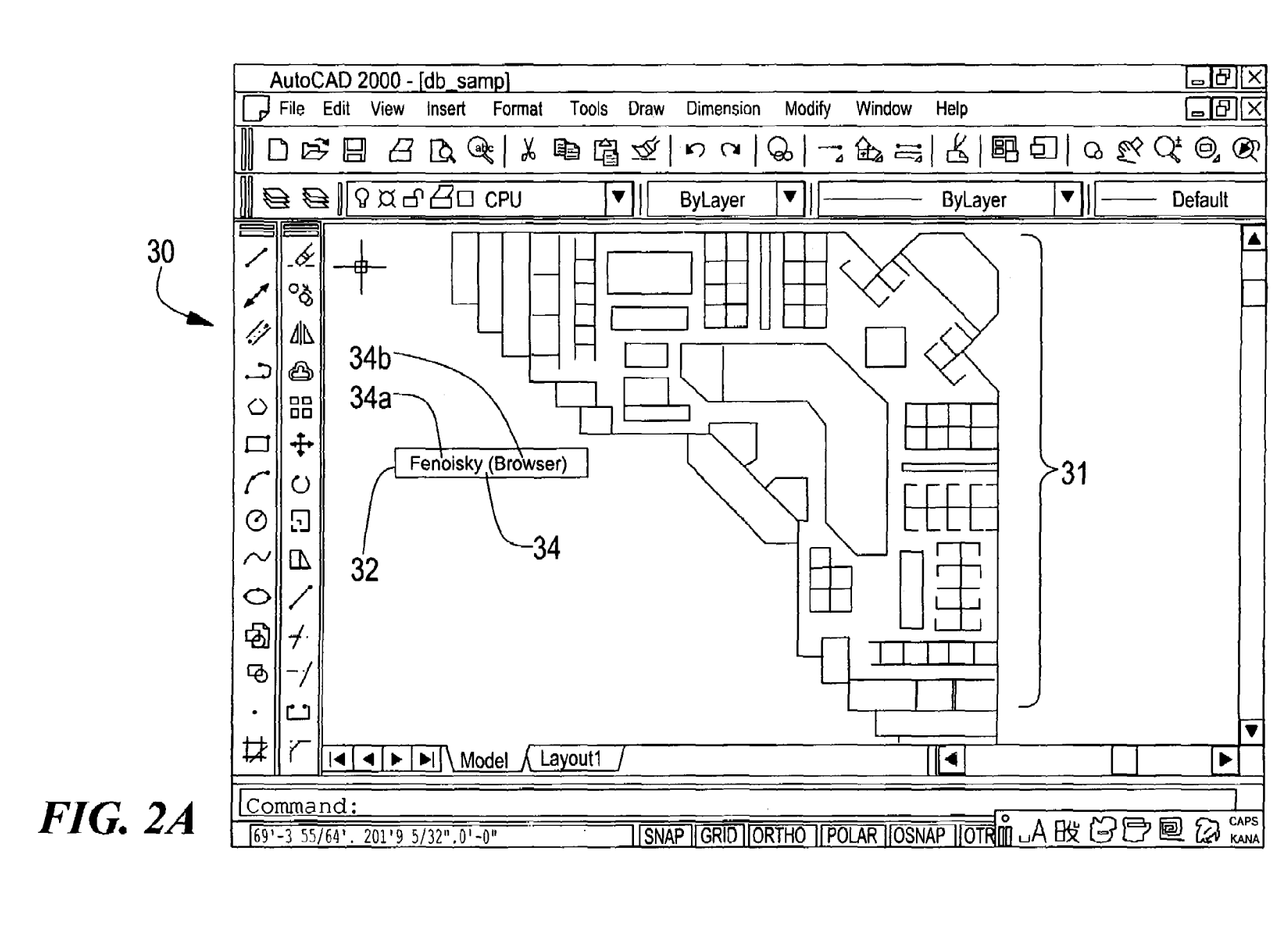
FIG. 2A is an illustrative user interface provided in accordance with the present invention.

Referring now to FIG. 2A, an illustrative user interface 30 associated with an interaction environment can be provided having user interface data 31 that is viewed by a participant in a collaboration session. The user interface 30 is also provided having an indicator icon 32, for example a pointing icon, that is moved by a computer pointing device, such a mouse or the like. An "information view" 34 having "information fields" 34a, 34b is provided in association with the indicator icon 32. It will be understood that the "information view," as used herein, refers to a presentation of information upon a user interface, wherein the presentation can be provided in a variety of ways, including but not limited to a text bar, a text box, and a note layer. It will also be understood that the "information fields" correspond to types of information that can be provided in the information view, including, but not limited to, a "participant identifier" and a "platform identifier" described below. It will be further understood that the "indicator icon," as used herein, can be provide as one of a variety of images, including, but not limited to, a pointing icon, a graphical figure, or a photographic image.

The information view can provide a variety of information, for example a "participant identifier" 34a that identifies the controlling participant, or more generally, any participant. Other information that can be provided by the information view is described below.

In general, in a collaboration environment, a variety of participants having a variety of user interfaces devices can interact. Whereas it is generally possible for any participant to move a respective indicator icon on a respective user interface associated with the participant, it is desirable to designate one participant as having control of the floor of the collaboration session. If one controlling participant controls the floor, indicator icon movements and changes to the user interface data seen by all participants can correspond to the indicator icon movements and the user interface data changes of the controlling participant. With a designated controlling participant, the interaction system 10 (FIG. 1) can avoid confusion that would arise if multiple participants simultaneously move respective indicator icons and simultaneously change user interface data.

Any participant can be designated to be the participant that controls the floor of the collaboration session. In one illustrative embodiment, the user interface 30 is viewed by a participant identified as Feniosky, and participant Feniosky has also been designated to be the controlling participant. The information view 34 can be provided having the participant identifier 34a. Here, the participant name, Feniosky, is the participant identifier 34a. When the controlling participant Feniosky moves the indicator icon 32 and makes changes to the user interface data 31, other participants viewing respective user interfaces see a indicator icon and an information view corresponding to the indicator icon 32 and the information view 34, and other participants view the changes to the user interface data 31 performed by the controlling participant Feniosky. Other participant identifiers that can be provided by this invention include, but are not limited to, a picture of the participant.

The information view 34 can also be provided having the platform identifier 34b that identifies the processing device with which the person identified by the participant identifier 34a is viewing the collaboration session. A variety of information can be provided to identify the type of platform. In one embodiment, the platform identifier 34b is provided that identifies the software type used to view the user interface 30. Here, the participant Feniosky is using a processing device having browser software to view the collaboration session. Thus, the platform identifier 34b is provided to indicate "(Browser)."

It will be recognized that the (Browser) platform identifier 34b corresponds to software that is typically used in conjunction with a computational device. It should also be recognized that the software type is but one of a variety of platform identifiers 34b that can be provided in the information view 34 to identify the processing device with which the person identified by the participant identifier 34a is viewing the collaboration session. Other platform identifiers that can be provided by this invention include, but are not limited to a platform version, a platform manufacturer, a platform operating system, a platform bus speed, a platform network connection, a platform network latency value, a platform name (e.g. PDA), and a platform data rate value, and a network throughput value associated with a collaboration participant network connection. It should be recognized that the information view 34 can be provided having a variety of information associated with the participant identified by the participant identifier 34a.

Figure 2B:
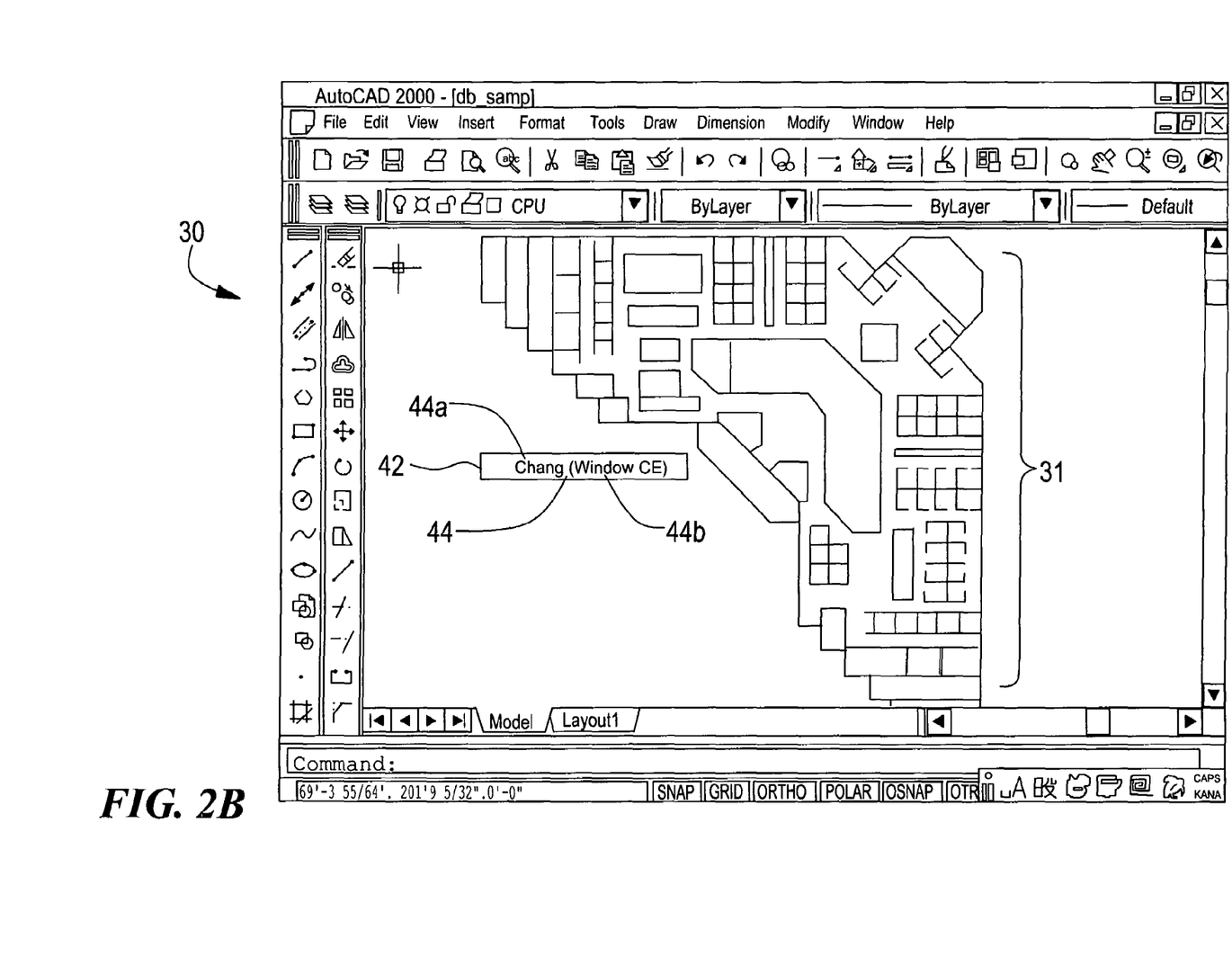
FIG. 2B is another illustrative user interface provided in accordance with the present invention.

Referring now to FIG. 2B, in which like elements of FIG. 2A are shown having like reference designations, the illustrative interaction environment user interface 30 with which participant Feniosky views the user interface data 31 in the collaboration session includes a indicator icon 42 with an associated information view 44 that are moved by a computer pointing device. In this illustrative embodiment, a participant Chang is designated to be in control of the floor of the collaboration session. Though displayed on the user interface 30 viewed by participant Feniosky, the indicator icon 42 and the information view 44 are associated with the controlling participant Chang. When participant Chang moves a corresponding indicator icon on his user interface (not shown) using his pointing device and makes changes to user interface information upon his user interface, the indicator icon 42 along with the information view 44 move accordingly on the user interface 30 viewed by participant Feniosky. It should be recognized that a similar indicator icon and information view can also move accordingly on the user interfaces viewed by a variety of other participants.

The information view 44 includes a participant identifier 44a, Chang, and a platform identifier 44b, (Windows CE). It will be recognized that the (Windows CE) platform identifier 44b corresponds to software that is typically used in association with a PDA.

The controlling participant can be statically identified by way of a graphical user interface. In an alternate embodiment, the controlling participant can be dynamically identified, for example, as the first participant to move their respective indicator icon following a pre-determined period of interaction inactivity. It will be recognized that the controlling participant can be identified in a variety of ways, including but not limited to, the name of the controlling participant, a highlighted participant name in a participant list, and/or a picture of the controlling participant presented upon participant user interfaces.

The information view, for example information view 44, can be controlled by the controlling participant. In one embodiment, the controlling participant can select that the indicator icon an/or the information view and/or selected information fields be visible on the user interfaces of the other participants. In an alternate embodiment, the controlling participant can select that the indicator icon and/or the information view and/or selected information fields not be visible on the user interfaces of the other participants. In yet another embodiment, the controlling participant can select that control of the above described visibilities be given to each respective participant. In yet another embodiment, a pre-set "agenda," can be provided in which the above mentioned visibilities, i.e. display options, can be pre-established in a form, list, or the like. Furthermore, where the display options have been pre-set in an agenda, the controlling participant can override the options.

The content and the format of the information view, for example information view 44, can be specified during each collaboration session. Each portion of the information view, for example the participant identifier 44a and the platform identifier 44b, can have the same text format, or each portion can have a different text format. In one embodiment, a syntax for selecting the information view content and format can be an HTML-based syntax, for example:

<font size=n face=fontface color=fontcolor> Message Placeholder </font>

Message Placeholder <user.name, user.platform, user.viewer>

The following attributes can be used to specify participant identifier and platform identifier format:

TABLE 1

Special attributes for information view message format

| attributes | Meaning |
| --- | --- |
| <b> . . . </b> | Boldface |
| <i> . . . </i> | Italics |
| <sup> . . . </sup> | Superscript font |
| <sub> . . . </sub> | Subscript font |
| <s> . . . </s> | Strikeout |
| <u> . . . </u> | Underline |

Figure 3:
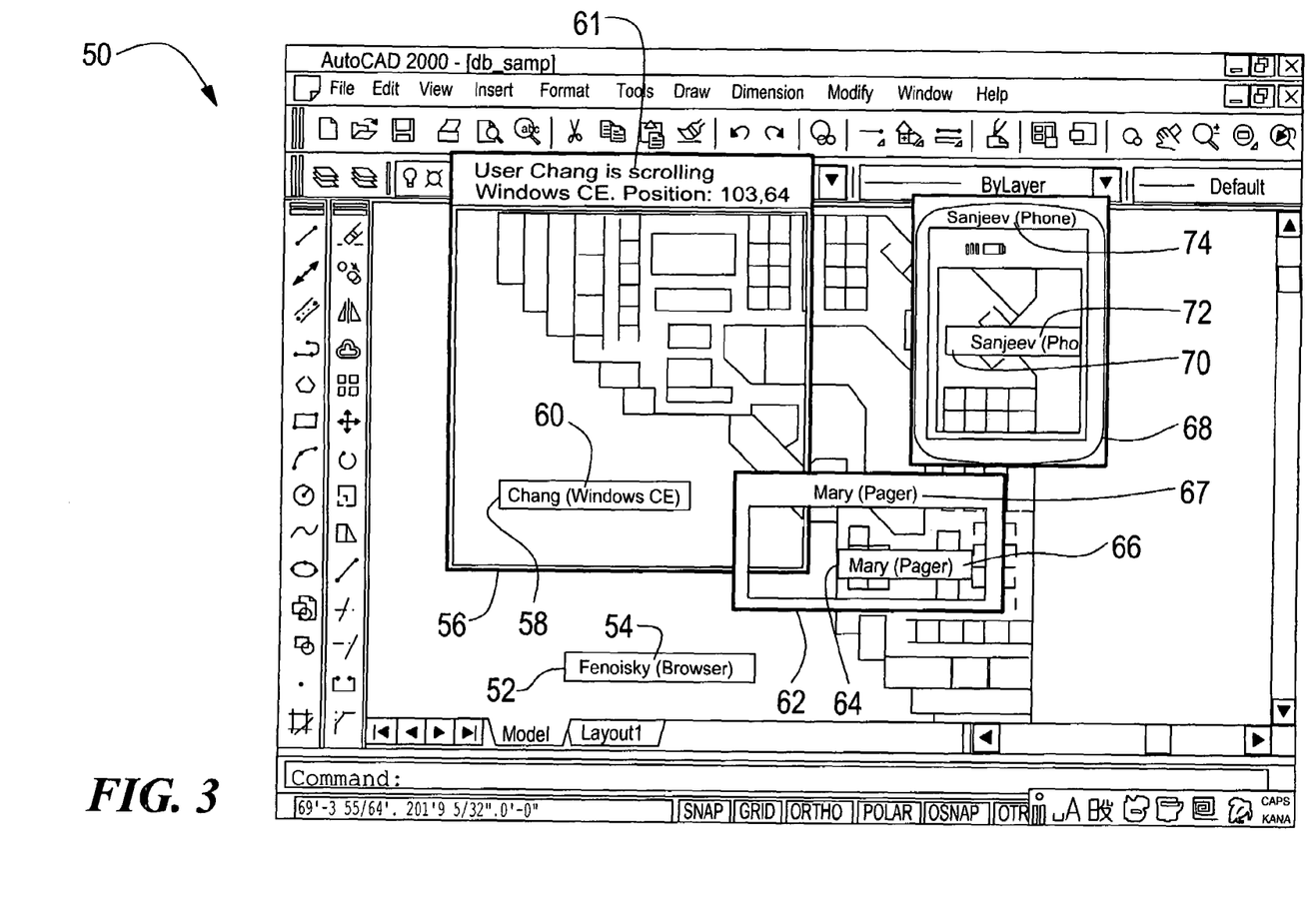
FIG. 3 is yet another illustrative user interface provided in accordance with the present invention.

Referring now to FIG. 3, in another aspect of this invention, a user interface 50 viewed by a participant includes a variety of borders 56, 62, 68 that identify, to the viewing participant, the boundaries of the views seen by a variety of other participants upon their respective user interfaces. The user interface 50 can include a indicator icon 52 and an information view 54 associated with a controlling participant as described above. In an alternate embodiment, the information view 54 can be associated with the participant viewing the user interface 50, who may not be the controlling participant.

Each border 56, 62, 68 can include a indicator icon 58, 64, 70 respectively and an information view 60, 66, 72 associated with the participant viewing the user interface identified by the border 56, 62, 68 respectively. The information views 54, 60, 66, 72 can be of a type, for example, as described above in association with FIGS. 2A–2B. Here, however, the information views 60, 66, 72 provide information about each respective participant, rather than information about only the controlling participant. Border headers 61, 67, 74 can further identify the participant associated with each respective border 56, 62, 68.

It should be recognized that a processing device used by a participant can include, but is not limited to, a desktop computer, a laptop computer, a personal digital assistant (PDA), a wireless telephone, and a pager. The processing devices can have user interfaces with a wide variety of sizes and resolutions as shown in Table 2, that provide a wide variety of "display fields."

TABLE 2

Exemplary user interface sizes and resolutions

| Platform | Screen size | Resolution |
| --- | --- | --- |
| Desktop | 15", 17", 19", 21" | 800 × 600, 1024 × 768, 1152 × 864, 1280 × 1024, 1600 × 1200 |
| Laptop | 12.1", 13.3", 14.1", 15.5" | 800 × 600, 1024 × 768 |
| Palm OS ® | Palm III/V ™: 4.7" × 3.2"<br>Palm VII ™: 5.25" × 3.25" | 160 × 160 |
| Windows CE ® (HPC) | Compaq iPaq H3650 ™: 5.11" × 3.28"<br>HP Jornada 545 ™: 5.2" × 3.1"<br>CASIO Cassiopeia E-115 ™: 5.2" × 3.25" | 240 × 320 |
| Phone* | 2.5" × 4.6" | 96 × 128, 96 × 54 |
| Pager* | 3.5" × 2.5" | 150 × 60 |

Where the various participants have user interfaces comprised of graphical displays with different sizes and resolutions, i.e., different display fields, confusion can result. For example, where a participant viewing a large desktop graphical display may see an entire schematic diagram, a participant viewing a PDA graphical display may only see a portion of the schematic. The participant using the PDA can view the entire schematic only by scrolling his respective graphical display by using a pointing device such as a mouse or the like. Thus, collaboration amongst participants and associated graphical activity corresponding to a particular portion of the schematic can be confusing to a participant viewing with the PDA graphical display who is not viewing the particular portion.

The borders 56, 62, 68 generated upon the user interface 50, and the associated border headers 61, 67, 74 provide a means by which a participant viewing the user interface 50 can understand which portions of the respective user interface each participant is viewing, such portions also described above as display fields. The participant viewing the user interface 50 can also understand the position of the indicator icons 58, 64, 70 associated with each respective participant, further identified by the information views 60, 66, 72.

While solid borders 56, 62, 68 are shown, it will be recognized that other graphics or text can be provided to indicate the display field that each participant is viewing.

While one user interface 50 is shown, it will be understood that similar borders, respective indicator icons, and respective information views can be shown on other user interfaces viewed by other participants. It should also be understood that a indicator icon corresponding to indicator icon 52 and an information view corresponding to information view 54 can be shown on the user interfaces viewed by the other participants As described above, such indicator icons and such information views viewed by the other participants can be associated either with the controlling participant of with the other participants.

It should be recognized that, where a first participant views with a first user interface having a smaller viewing area than a second user interface viewed by a second participant, a border associated with the second user interface, the respective indicator icon, and the respective information view may not be included on the first user interface. The border associated with the second user interface is larger than the viewing region of the first user interface. Alternatively, a portion of the border associated with the second user interface and/or the respective indicator icon, and/or the respective information view can be shown on the first user interface where appropriate. For example, in one embodiment, where the participant viewing the second user interface has moved his respective view to a corner of the second user interface, a partial border indicating the corner can be shown on the first user interface.

The border header, for example border header 61, can also identify activity corresponding to the participant associated with the respective border 56. Here, in border header 61, indication is given that participant Chang is moving his respective indicator icon. Information that can be indicated in the border header includes, but is not limited to, participant identity, participant indicator icon activity, and participant status, e.g. controlling or non-controlling participant.

As described in association with FIG. 2A, a variety of display options can either be pre-set in an agenda, or can be dynamically set at any time by the controlling participant. In one embodiment, the controlling participant can select that the border and/or associated border header be visible on the user interfaces of the other participants. In an alternate embodiment, the controlling participant can select that the border and/or associated border header not be visible on the user interfaces of the other participants. In yet another embodiment, the controlling participant can select that control of the above described visibilities be given to each respective participant.

Figure 4:
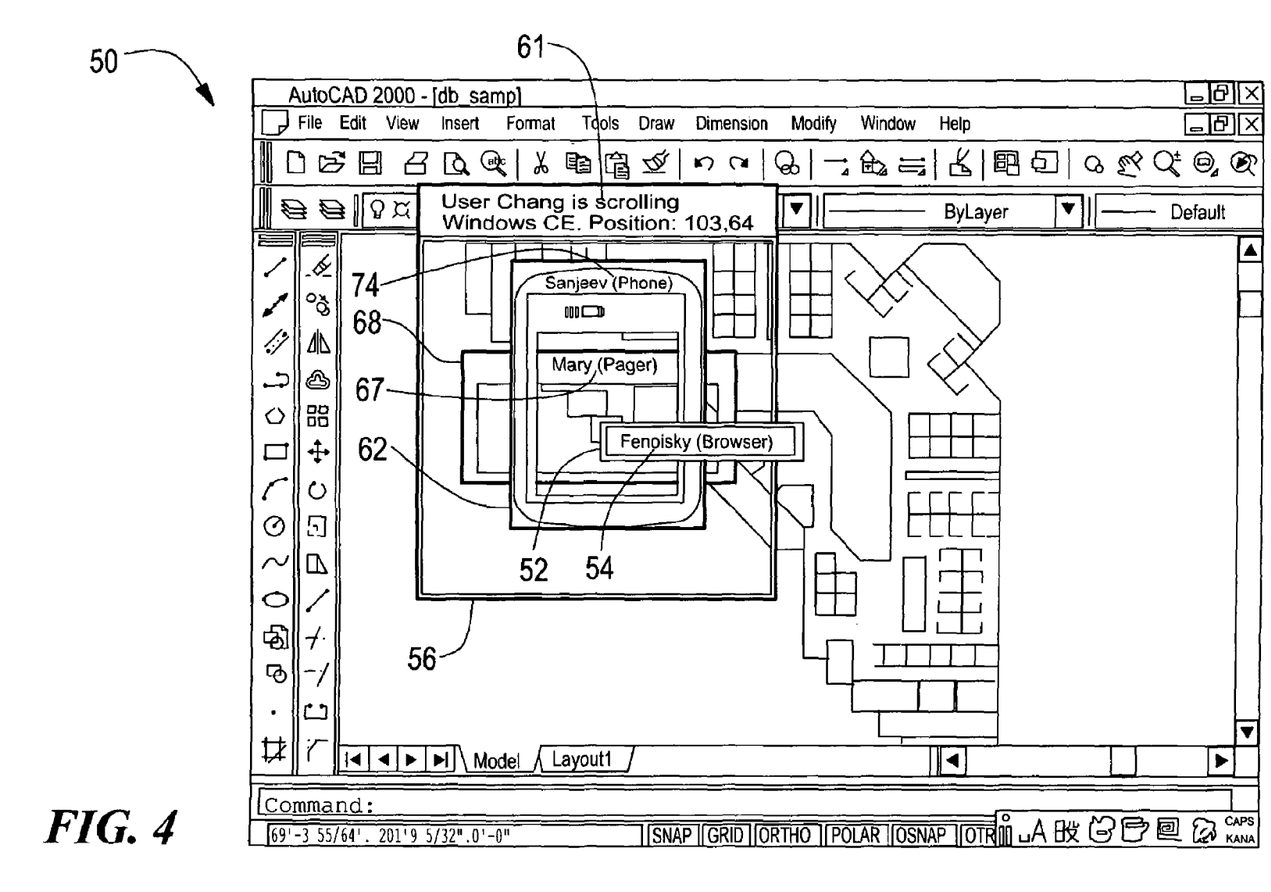
FIG. 4 is yet another illustrative user interface provided in accordance with the present invention.

Referring now to FIG. 4, in which like elements of FIG. 3 are shown having like reference designations, a user interface 50 includes the variety of borders 56, 62, 68. The user interface 50 can include the indicator icon 52 and an information view 54 associated with the controlling participant, or, in an alternate embodiment, associated with the participant viewing the user interface 50. The borders 56, 62, 68 can also include the border headers 61, 67, 74 that can identify the participant associated with each respective border 56, 62, 68, and activity associated with the respective participants as described above.

Here, each border 56, 62, 68 is aligned with the indicator icon 52, and each respective participant views, on their respective user interface, the view corresponding to the aligned borders 56, 62, 68. Furthermore, each participant has the same focus of attention to the same region of the displayed information. Additionally, for clarity, each border 56, 62, 68 does not include an indicator icon, for example the indicator icon 58, 64, 70 of FIG. 3, and an information view, for example the information view 60, 66, 72 of FIG. 3. Alternatively, each boundary 56, 62, 68 can include the indicator icon and the information view.

As described above, while one user interface 50 is shown, it will be understood that similar borders can be shown on the user interfaces viewed by other participants. Also, an indicator icon corresponding to indicator icon 52 and an information view corresponding to information view 54 can be shown on the user interfaces viewed by the other participant Such indicator icons and such information views viewed by the other participants can be associated either with the controlling participant of with the other participants.

As described above, where a first user interface has a smaller viewing area than a second user interface, a border associated with the second user interface may only be included on the first user interface, in a bird's-eye-view format. Alternatively, a portion of the border associated with the second user interface can be shown on the first user interface where appropriate.

The alignment of the borders 56, 62, 68 can be selected by one participant. The controlling participant can select that the user interfaces associated with other participants align with his indicator icon, thus causing the other participants to have the same focus of attention to a particular display area. When the other participants are forced to the same focus of attention, their respective border portions, for example, the borders 56, 62, 68 are aligned as indicated.

As described in association with FIG. 2A, a variety of display options can either be pre-set in an agenda, or can be dynamically set at any time by the controlling participant. In one embodiment, the controlling participant can select the focus of attention of the display fields of other respective participants, and thus the corresponding borders will align (e.g., FIG. 4). In an alternate embodiment, the controlling participant can select that control of the respective display fields be given to each respective participant, and thus, the corresponding border may not align (e.g., FIG. 3). The forcing to a particular focus of attention described above is but one of a variety of display options.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. A collaboration system comprising:
   an information view associated with an indicator icon, the information view disposed upon a plurality of displays associated with a respective plurality of collaboration participant processing devices, wherein the information view and the indicator icon are adapted to move on the plurality of displays in accordance with control by a controlling participant identified as any one of one or more collaboration participants, wherein the information view includes a platform identifier indicative of a characteristic of at least one of the one or more collaboration participant processing devices, wherein the platform identifier includes at least one of a software type, a platform version, a platform manufacturer, a platform operating system, a platform bus speed, a platform network connection, a platform network latency value, a platform data rate value, or a network throughput value, wherein the network throughput value is associated with a collaboration participant network connection.

2. The collaboration system of claim 1, wherein the platform identifier is associated with the controlling participant.

3. The collaboration system of claim 1, wherein the controlling participant is statically defined.

4. The collaboration system of claim 1, wherein the controlling participant is dynamically defined.

5. The collaboration system of claim 1, wherein the platform identifier further includes a platform name.

6. The collaboration system of claim 1, wherein a collaboration participant controls the visibility of at least one of the indicator icon and the information view upon a respective one of the one or more displays.

7. The collaboration system of claim 1, wherein the platform identifier is automatically obtained from the collaboration system.

8. The collaboration system of claim 1, wherein the information view further includes a participant identifier associated with the controlling participant.

9. A collaboration system comprising:
   a first display field disposed upon a first one of a plurality of collaboration participant processing devices; and
   a display border portion disposed within said first display field, wherein the display border portion comprises a border line indicative of a boundary of another display field associated with another one of the plurality of collaboration participant processing devices, wherein the display border portion has a size and a position in said first display field in accordance with the another display field, wherein the display border portion is adapted to move in at least two orthogonal directions on the first display field in accordance with the another display field, and wherein the another display field has a size different from a size of the first display field.

10. The collaboration system of claim 9, wherein the position of the display border portion is controlled by the another one of the plurality of collaboration participant processing devices in accordance with the another display field.

11. The collaboration system of claim 9, wherein the another display field has a size smaller than the first display field, and wherein the position of the display border portion is controllable by the first one of the plurality of collaboration participant processing devices and the another display field of the another collaboration participant is controllable to move in at least two orthogonal directions by the first one of the plurality of collaboration participants, accordingly.

12. The collaboration system of claim 9, wherein the display border portion includes an indicator icon associated with the another one of the plurality of collaboration participant processing devices, wherein the indicator icon is displayed within the display border portion.

13. The collaboration system of claim 12, wherein the display border portion includes an information view associated with the another one of the plurality of collaboration participant processing devices, wherein the information view is displayed within the display border portion.

14. The collaboration system of claim 13, wherein the information view includes a participant identifier associated with the another one of the plurality of collaboration participant processing devices.

15. The collaboration system of claim 13, wherein the information view includes a platform identifier indicative of a characteristic of the another one of the plurality of collaboration participant processing devices.

16. The collaboration system of claim 13, wherein one of the plurality of collaboration participants controls the visibility of at least one of the display border portion, the indicator icon, or the information view upon the first one of the one or more collaboration participant processing devices.

17. The collaboration system of claim 9, wherein the another display field has a resolution different from a resolution of the first display field.

18. A collaboration method, comprising:
identifying a controlling participant as any one of one or more collaboration participants;
generating an information view associated with an indicator icon, the information view disposed upon a plurality of displays associated with a respective plurality of collaboration participant processing devices, wherein the indicator icon and the information view are adapted to move on the plurality of displays in accordance with control by the controlling participant, wherein the information view includes a platform identifier indicative of a characteristic of at least one of the one or more collaboration participant processing devices, wherein the platform identifier includes at least one of a software type, a platform version, a platform manufacturer, a platform operating system, a platform bus speed, a platform network connection, a platform network latency value, a platform data rate value, or a network, throughput value, wherein the network throughput value is associated with a collaboration participant network connection; and
controlling, by the controlling participant, a position of the indicator icon and the information view on the plurality of collaboration participant processing devices.

19. The collaboration method of claim 18, wherein the platform identifier is associated with the controlling participant.

20. The collaboration method of claim 18, wherein the identifying the controlling participant comprises:
statically defining the controlling participant.

21. The collaboration method of claim 18, wherein the identifying the controlling participant comprises:
dynamically defining the controlling participant.

22. The collaboration method of claim 18, wherein the platform identifier further includes a platform name.

23. The collaboration method of claim 18, wherein the generating the information view associated with the indicator icon includes controlling the visibility of at least one of the indicator icon and the information view upon a respective one of the one or more collaboration participant processing devices.

24. The collaboration method of claim 18, wherein the platform identifier is automatically obtained from the at least one of the one or more collaboration participant processing devices.

25. The collaboration method of claim 18, wherein the information view further includes a participant identifier associated with the controlling participant.

26. A collaboration method comprising:
generating a display border portion disposed within a first display field, wherein the first display field is disposed upon a first one of a plurality of collaboration participant processing devices, wherein the display border portion comprises a border line indicative of a boundary of another display field associated with another one of the plurality of collaboration participant processing devices, the display border portion having a size and a position in the first display field in accordance with another display field; and
moving the position of the display border portion in at least two orthogonal directions on the first display field in accordance with the another display field, wherein the another display field has a size different from a size of the first display field.

27. The collaboration method of claim 26, wherein the another display field has a size smaller than the first display field, the method further comprising:
controlling the position of the another display border portion with the first one of the plurality of collaboration participant processing devices, resulting in the another display field of the another collaboration participant processing device being controlled to move in at least two orthogonal directions, accordingly.

28. The collaboration method of claim 26, further comprising:
generating an indicator icon associated with the another one of the plurality of collaboration participant processing devices, the indicator icon disposed within the display border portion.

29. The collaboration method of claim 28, further comprising:
generating an information view associated with the another one of the plurality of collaboration participant processing devices, the information view disposed within the display border portion.

30. The collaboration method of claim 29, wherein the information view includes a participant identifier associated with the another one of the plurality of collaboration participant processing devices.

31. The collaboration method of claim 29, wherein the information view includes a platform identifier indicative of a characteristic of the another one of the plurality of collaboration participant processing devices.

32. The collaboration method of claim 29, wherein generating the display border portion includes controlling the visibility of at least one of the border portion, the indicator icon, or the information view upon the first one of the one or more collaboration participant processing devices.

33. The collaboration method of claim 26, wherein the another display field has a resolution different from a resolution of the first display field.

34. A computer medium having computer readable code, comprising:
instructions for identifying a controlling participant as any one of one or more collaboration participants;
instructions for generating an information view associated with an indicator icon, the information view disposed upon a plurality of displays associated with a respective plurality of collaboration participant processing devices, wherein the indicator icons and the information view are adapted to move on the plurality of displays in accordance with control by the controlling participant, wherein the information view includes a platform identifier indicative of a characteristic of at least one of the one or more collaboration participant processing devices, wherein the platform identifier includes at least one of a software type, a platform version, a platform manufacturer, a platform operating system, a platform bus speed, a platform network connection, a platform network latency value, a platform data rate value, or a network throughput value, wherein the network throughput value is associated with a collaboration participant network connection; and
instructions for controlling, by the controlling participant, a position of the indicator icon and the information view on the plurality of collaboration participant processing devices.

35. The computer program medium of claim 34, wherein the platform identifier is associated with the controlling participant.

36. The computer program medium of claim 34, wherein the instructions for identifying the controlling participant include:

instructions for statically defining the controlling participant.

37. The computer program medium of claim 34, wherein the instructions for identifying the controlling participant include:

instructions for dynamically defining the controlling participant.

38. The computer program medium of claim 34, wherein the platform identifier further includes a platform name.

39. The computer program medium of claim 34, wherein the instructions for generating an information view associated with the indicator icon include instruction for controlling the visibility of at least one of the indicator icon and the information view upon a respective one of the one or more collaboration participant processing devices.

40. The computer program medium of claim 34, wherein the platform identifier is automatically obtained from the at least one of the one or more collaboration participant processing devices.

41. The computer program medium of claim 34, wherein the information view further includes a participant identifier associated with the controlling participant.

42. A computer medium having computer readable code, comprising:

instructions for generating a display border portion disposed within a first display field, wherein the first display field is disposed upon a first one of a plurality of collaboration participant processing devices, wherein the display border portion comprises a border line indicative of a boundary of another display field associated with another one of the plurality of collaboration participant processing devices, the display border portion having a size and a position in the first display field in accordance with another display field; and instructions for moving the position of the display border portion in at least two orthogonal directions on the first display field in accordance with the another display field, wherein the another display field has a size different from a size of the first display field.

43. The computer program medium of claim 42, wherein the another display field has a size smaller that the first display field, the computer medium further comprising:

instructions for controlling the position of the another display border portion with the first one of the plurality of collaboration participant processing devices, which result in the another display field of the another collaboration participant processing device being controllable to move in at least two orthogonal directions, accordingly.

44. The computer program medium of claim 42, further comprising:

instructions for generating an indicator icon associated with the another one of the plurality of collaboration participant processing devices, the indicator icon disposed within the display border portion.

45. The computer program medium of claim 44, further comprising:

instructions for generating an information view associated with the another one of the plurality of collaboration participant processing devices, the information view disposed within the display border portion.

46. The computer program medium of claim 45, wherein the information view includes a participant identifier associated with the another one of the plurality of collaboration participant processing devices.

47. The computer program medium of claim 45, wherein the information view includes a platform identifier indicative of a characteristic of the another one of the plurality of collaboration participant processing devices.

48. The collaboration method of claim 45, wherein generating the display border portion includes controlling the visibility of at least one of the border portion, the indicator icon, or the information view upon the first one of the one or more collaboration participant processing devices.

49. The computer program medium of claim 42, wherein the another display field has a resolution different from a resolution of the first display field.

* * * * *

UNITED STATES PATENT AND TRADEMARK OFFICE
CERTIFICATE OF CORRECTION

| | |
|---|---|
| PATENT NO. | : 7,162,699 B1 |
| APPLICATION NO. | : 10/125761 |
| DATED | : January 9, 2007 |
| INVENTOR(S) | : Feniosky Pena-Mora et al. |

It is certified that error appears in the above-identified patent and that said Letters Patent is hereby corrected as shown below:

Column 1, lines 13-14 delete "entitled Collaborative Agent Interaction Control and Synchronization System," and replace with --entitled "Collaborative Agent Interaction Control and Synchronization System,"--.

Column 1, line 15 delete 7,007,235 which" and replace with --7,007,235, which--.

Column 2, line 28-30 delete "entitled Collaborative Agent Interaction Control and Synchronization System," and replace with --entitled "Collaborative Agent Interaction Control and Synchronization System,"--.

Column 5, lines 57-58 delete "entitled Collaborative Agent Interaction Control and Synchronization System," and replace with --entitled "Collaborative Agent Interaction Control and Synchronization System,"--.

Column 6, line 6 delete "such a" and replace with --such as a--.

Column 6, lines 18-19 delete "can be provide" and replace with --can be provided--.

Column 6, line 28 delete "interfaces devices" and replace with --interface devices--.

Column 7, line 36 delete "move" and replace with --moves--.

Column 8, line 49 delete "include a indicator" and replace with --include an indicator--.

Signed and Sealed this

Twenty-sixth Day of June, 2007

JON W. DUDAS
*Director of the United States Patent and Trademark Office*